United States Patent
Tang et al.

(10) Patent No.: US 10,928,090 B2
(45) Date of Patent: Feb. 23, 2021

(54) MULTI-COMPONENT AIR-CONDITIONING SYSTEMS CONFIGURATION, CONTROL AND OPERATION

(71) Applicants: SINGAPORE TECHNOLOGIES DYNAMICS PTE LTD, Singapore (SG); INNOSPARKS PTE LTD, Singapore (SG); MANDAI PARK DEVELOPMENT PTE. LTD., Singapore (SG)

(72) Inventors: Ee Ho Tang, Singapore (SG); Fuyun Li, Singapore (SG); Tze Wei Timothy Ang, Singapore (SG); Edward Elmore Howland, Singapore (SG)

(73) Assignees: SINGAPORE TECHNOLOGIES DYNAMICS PTE LTD, Singapore (SG); INNOSPARKS PTE LTD, Singapore (SG); MANDAI PARK DEVELOPMENT PTE. LTD., Singapore (SG)

( * ) Notice: Subject to any disclaimer, the term of this patent is extended or adjusted under 35 U.S.C. 154(b) by 60 days.

(21) Appl. No.: 15/773,260

(22) PCT Filed: Dec. 23, 2015

(86) PCT No.: PCT/SG2015/050503
§ 371 (c)(1),
(2) Date: May 3, 2018

(87) PCT Pub. No.: WO2017/078616
PCT Pub. Date: May 11, 2017

(65) Prior Publication Data
US 2018/0320919 A1  Nov. 8, 2018

Related U.S. Application Data

(60) Provisional application No. 62/251,253, filed on Nov. 5, 2015.

(51) Int. Cl.
*F24F 11/00* (2018.01)
*F24F 11/65* (2018.01)
(Continued)

(52) U.S. Cl.
CPC ............ *F24F 11/65* (2018.01); *F24F 1/0007* (2013.01); *F24F 5/00* (2013.01); *F24F 5/0035* (2013.01);
(Continued)

(58) Field of Classification Search
CPC ........ F24F 1/0007; F24F 5/0035; F24F 11/65; F24F 2110/10; F24F 11/20
See application file for complete search history.

(56) References Cited

U.S. PATENT DOCUMENTS 4,235,094 A * 11/1980 Matochkin .............. G01M 7/00
73/11.01
5,193,352 A   3/1993 Smith et al.
(Continued)

FOREIGN PATENT DOCUMENTS

CN    202392925 U    8/2012
CN    202546965 U    11/2012
(Continued)

OTHER PUBLICATIONS

International Preliminary Report on Patentability (International Application No. PCT/SG2015/050503); dated Aug. 31, 2017.
(Continued)

*Primary Examiner* — Jonathan Bradford
(74) *Attorney, Agent, or Firm* — Howard & Howard Attorneys PLLC (57) ABSTRACT

The present invention relates to a multi-component air-conditioning systems configuration, control and operation. The structure comprises an environmental sensor, a controlling chip, and a plurality of unique cooling components,
(Continued)

wherein the cooling components are activated or inactivated according to a most efficient operating mode. Said most efficient operating mode is determined depends on the plurality of environmental parameters sensed by the environmental sensor in order to deliver an effective and efficient temperature reduction.

6 Claims, 12 Drawing Sheets

(51) Int. Cl.
*F24F 1/0007* (2019.01)
*F24F 5/00* (2006.01)
*F24F 11/62* (2018.01)
*F24F 11/30* (2018.01)
*F24F 110/10* (2018.01)
*F24F 110/20* (2018.01)

(52) U.S. Cl.
CPC .............. *F24F 11/30* (2018.01); *F24F 11/62* (2018.01); *F24F 2110/10* (2018.01); *F24F 2110/20* (2018.01); *Y02B 30/54* (2013.01)

(56) References Cited

U.S. PATENT DOCUMENTS

| | | |
|---|---|---|
| 5,613,372 A | 3/1997 | Beal et al. |
| 7,765,827 B2 | 8/2010 | Schlom et al. |
| 8,151,578 B1 | 4/2012 | Morales et al. |
| 2010/0154448 A1 | 6/2010 | Hay |
| 2011/0120693 A1 | 5/2011 | Kammerzell et al. |
| 2013/0062047 A1 | 3/2013 | Vaney et al. |
| 2014/0190198 A1 | 7/2014 | Slessman et al. |

FOREIGN PATENT DOCUMENTS

| | | |
|---|---|---|
| CN | 104791932 A | 7/2015 |
| WO | 2012/037291 A2 | 3/2012 |

OTHER PUBLICATIONS

Deng, J. et al; Progress in Energy and Combustion Science 37; A review of thermally activated cooling technologies for combined cooling, heating and power systems; Elsevier; 2011; pp. 172-203; www.elsevier.com/locate/pecs.

Extended European Search Report (EP Application No. 15907904.5-1008); dated Oct. 7, 2019; 9 pages.

Office Action (CN Application No. 201580084382.3); dated Dec. 4, 2019; 18 pages.

* cited by examiner

MULTI-COMPONENT AIR-CONDITIONING SYSTEMS CONFIGURATION, CONTROL AND OPERATION

CROSS-REFERENCE TO RELATED APPLICATIONS

This application is a National Phase of International Patent Application No. PCT/SG2015/050503, filed Dec. 23, 2015, which claims the benefit of U.S. patent application Ser. No. 62/251,253, filed Nov. 5, 2015, the disclosures of which are hereby incorporated by reference in their entirety.

FIELD OF THE INVENTION

The present invention relates to a method for air-conditioner device, and particularly to a hybrid air-conditioner device that includes a variety of cooling components and thus can lower the energy cost by selecting the most energy efficient unit cooling mode base on the psychrometrics of the environment.

BACKGROUND OF THE INVENTION

Air conditioning is an essential component of the built environment. In particular, the mechanical vapor compression system has been traditionally utilized to lower the ambient temperature and humidity to achieve a comfortable air supply. The main issue with the traditional air-conditioning system is its high operational cost associated with high energy consumption. Therefore, a variety of alternative air-conditioning systems have been developed that are targeted at addressing this problem, such as evaporative, geothermal and solar-based cooling.

Evaporative cooling systems are of interest as they are not only economical, but have seen a myriad of variations that enable it to achieve lower temperatures, beyond wet-bulb. Furthermore, innovative solutions have lowered maintenance requirements and raised hygiene levels; both of which had been persistent problems. Evaporative cooling can be categorized into two main groups of direct evaporative cooling and indirect evaporative cooling.

In seeking for a more energy efficient system that can serve all climates, it was recognized that a combination of cooling technologies would realize these requirements. However, the combined system requires a skilled understanding of the individual core components in order to achieve optimized integration and operational control.

SUMMARY OF THE INVENTION

An objective of the present invention is to provide a hybrid air-conditioner device and operating method thereof, wherein the hybrid air-conditioner device has a variety of cooling components. These different cooling components serve unique functions and are adequate to handle different environmental conditions. Each cooling component in the present invention can be activated or inactivated independently to select the most energy efficient unit corresponding to current psychrometrics of the environment. It is an effective way to enhance cooling effectiveness and efficiency significantly.

Another objective of the present invention is to provide a hybrid air-conditioner device and operating method thereof, wherein the cooling components may include not only direct and indirect evaporative cooling systems, but also mechanical vapor compression systems or geothermal-based systems, so that the present invention can reduce the air temperature under all-climate situations effectively, regardless of the ambient humidity.

In order to achieve the objectives as described above, the present invention discloses a hybrid air-conditioner device, which comprises an environmental sensor configured to sensing a plurality of environmental parameters; a controlling chip, electrically connected to the environmental sensor; and a plurality of cooling components, electrically connected to the controlling chip, and unique cooling components; wherein the cooling components are activated or inactivated depends on the plurality of environmental parameters sensed by the environmental sensor in order to deliver an effective and efficient temperature reduction.

The operating method for hybrid air-conditioner device comprises steps of: sensing a plurality of environmental parameters of an environment based on an ambient air sample; deciding whether to activate a plurality of cooling components based on the environmental parameters, an ambient air is conditioned to a conditioned air via activated cooling components, and the conditioned air may or may not bypasses inactivated cooling components; and delivering the conditioned air into a desired space.

DETAILED DESCRIPTION OF INVENTION

In order to make the structure and characteristics as well as the effectiveness of the present invention to be further understood and recognized, the detailed description of the present invention is provided as follows along with embodiments and accompanying figures.

Figure 1:
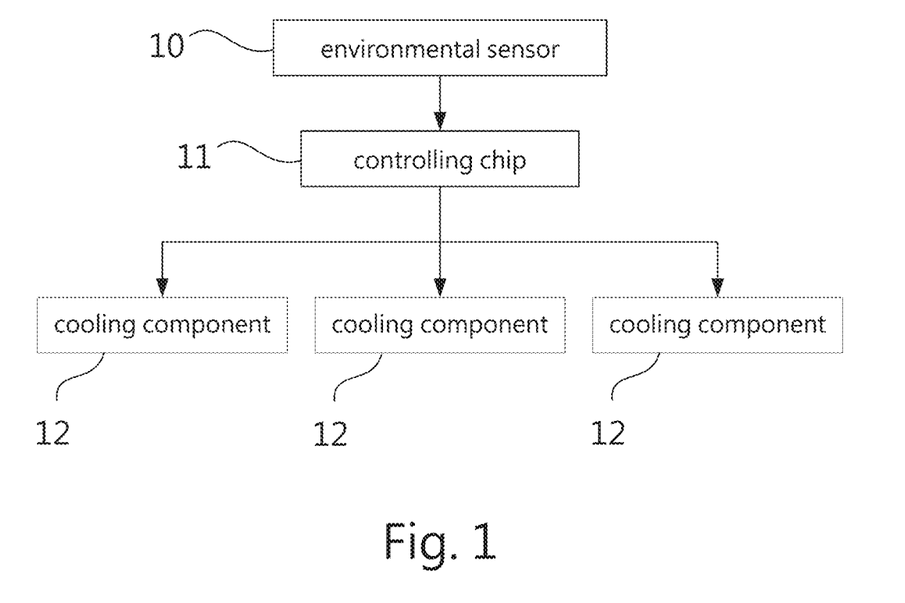
FIG. 1 shows a schematic diagram of the structure of system according to an embodiment of the present invention.

Please refer to FIG. 1, which shows a schematic diagram according to an embodiment of the present invention. The structure of the hybrid air-conditioner device according to the present invention comprises an environmental sensor 10, a controlling chip 11, and a plurality of cooling components 12. The environmental sensor 10 is configured to sensing a plurality of environmental parameters an ambient air sample, such as temperature and humidity. The environmental sensor 10 can be separated as multitude of sensors or be integrated as a single component. The controlling chip 11 is electrically connected to the environmental sensor 10 and receives the environmental parameters from the environmental sensor 10. The plurality of cooling components 12 are electrically connected to the controlling chip 11, and these cooling components 12 are differing from each other. The controlling chip 11 can activate or inactivate the cooling components 12 independently according to the environmental parameters received from the environmental sensor 10.

The present invention can be utilized to supply conditioned air to either a contained building space, such as offices and data centers, but also to the outdoor space due to its heightened efficiency. Therefore, it will draw either return air and/or fresh air that is/are channeled through the cooling components 12, either exclusively or as a mixture. The air intake selection, mixture and channeling are dependent on the ambient conditions in the outdoor and indoor environment as well as the core cooling technologies employed. As such, this integrated device will employ the environmental sensor 10 to sense temperature and humidity in order to determine the most energy efficient operation mode. Each operation mode will activate or inactivate appropriate cooling components 12 via the actuation of a variety of mechanical components such as dampers and blowers. The placement of the environmental sensor 10 can vary depending on the device setup, such as at an intake of the device or alternatively, at the intake of each individual cooling components 12.

Figure 2:
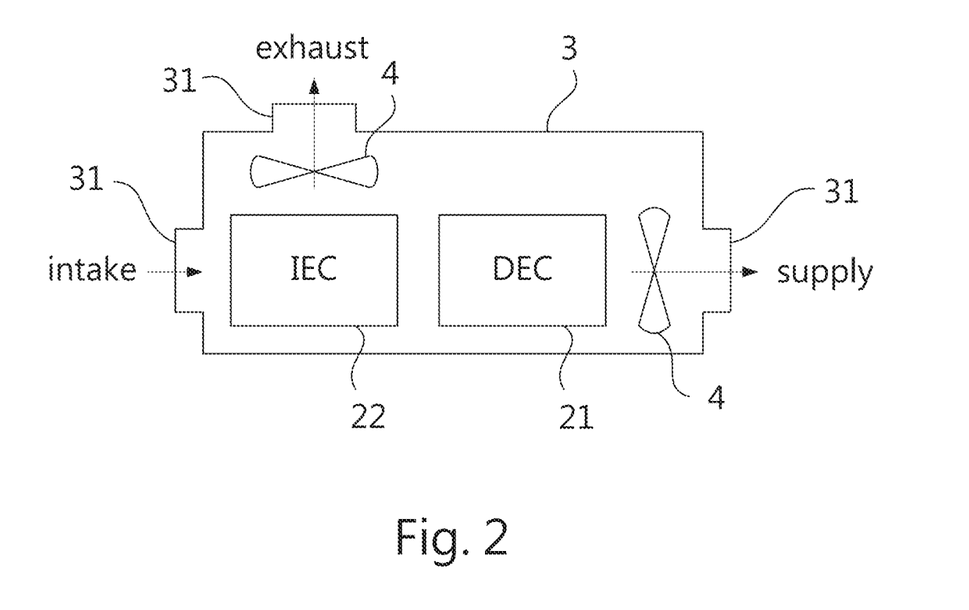
FIG. 2 shows a schematic diagram of the structure of coordinated cooling components according to an embodiment of the present invention.
Figure 3:
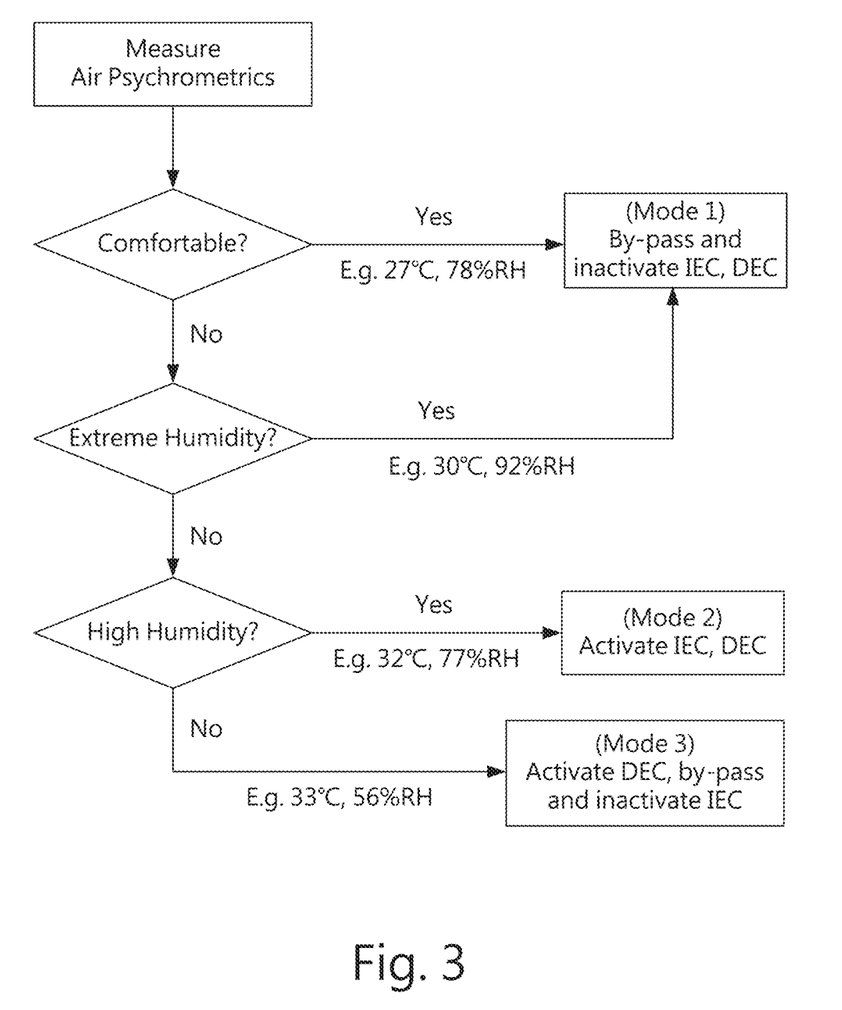
FIG. 3 shows a flowchart of the selection of operating method according to an embodiment of the present invention.

According to an embodiment of the present invention, refer to FIGS. 2 and 3, the cooling components are composed of a direct evaporative cooling unit (DEC) 21 and an indirect evaporative cooling unit (IEC) 22. The direct evaporative cooling unit 21 and the indirect evaporative cooling unit 22 are preferred be placed in a container 3 in order to channel an ambient air through either units to be conditioned, and so do the following embodiments. There are a plurality of openings 31 on the container 3 for air intake or supply. Furthermore, there are a plurality of fans 4 also placed in the container 3, which are configured to draw the ambient air from an environment, to exhaust warm air, or to supply conditioned air to a desired space.

After the environmental sensor 10 senses the quantitative value of temperature and humidity, the controlling chip will identify the most energy efficient and effective air conditioning pathway. Refer to FIG. 3, in an embodiment, each operating mode can be classified as:

[Mode 1]: For ambient psychrometric conditions that is at a comfortable level or extremely high humidity level. That is, Mode 1 is selected when ambient intake temperature is at a comfortable level (e.g. the temperature is under 28° C. and the humidity is under 80%) so that no conditioning is required; or the humidity is at an extremely high level (e.g. over 90%) so that conditioning is limited (i.e. direct and indirect evaporative cooling technologies have limited cooling effectiveness in a extreme humidity). This operating mode will inactivate and by-pass the direct evaporative cooling unit 21 and the indirect evaporative cooling unit 22 so that has the lowest energy cost.

[Mode 2]: For ambient psychrometric conditions that is at a high humidity level. That is, when ambient intake humidity is at a high level (e.g. more than 60%), both the direct evaporative cooling unit 21 and the indirect evaporative cooling unit 22 are activated to maximize cooling potential. The indirect evaporative cooling unit 22 provides an initial sensible cooling following which, the direct evaporative cooling unit 21 converts the sensible load to a latent load. This operating mode will have the highest energy cost.

[Mode 3]: For ambient psychrometric conditions that is in moderate to low humidity level. That is, when ambient intake humidity is at a moderate to low level (e.g. less than 60%), the device of the present invention will by-pass and inactivate the indirect evaporative cooling unit 22 and activate the direct evaporative cooling unit 21. The direct evaporative cooling unit 21 alone will sufficiently condition air and will have a moderate energy cost that is between Mode 1 and Mode 2. The energy can be saved because the indirect evaporative cooling unit 22 is not in operation.

Figure 4A:
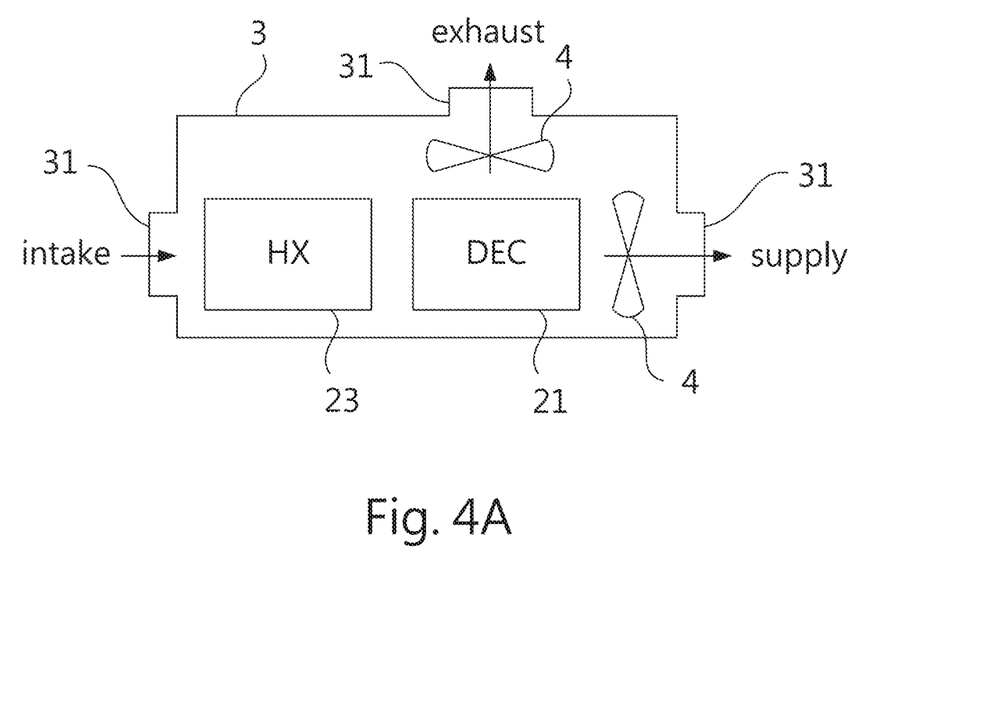
FIG. 4A shows a schematic diagram of the structure of coordinated cooling components according to another embodiment of the present invention.
Figure 4B:
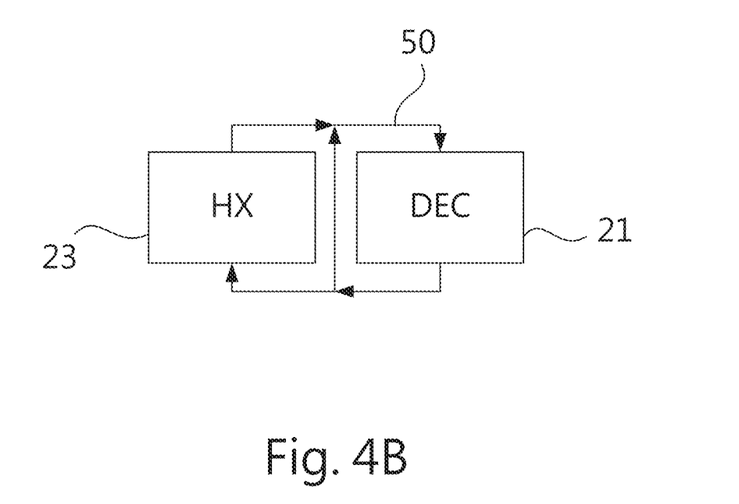
FIGS. 4B, 4C, and 4D show a schematic diagram of the water flow for both the direct evaporative cooling unit and heat exchanger in different operating modes according to another embodiment of the present invention.
Figure 4C:
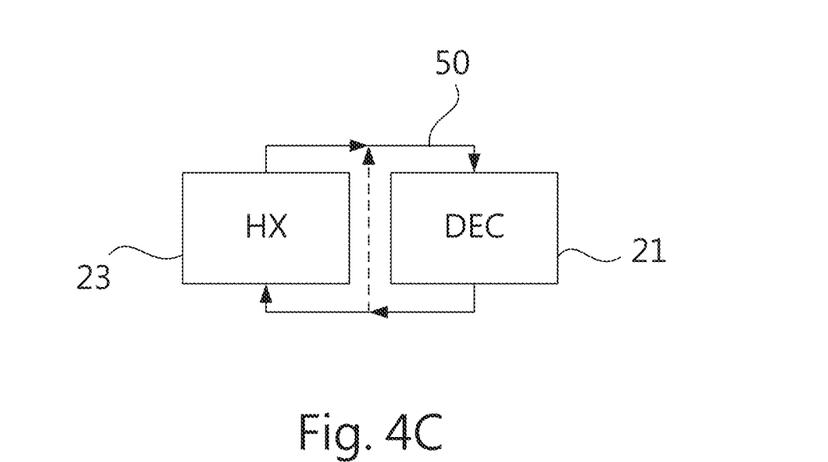
Figure 5:
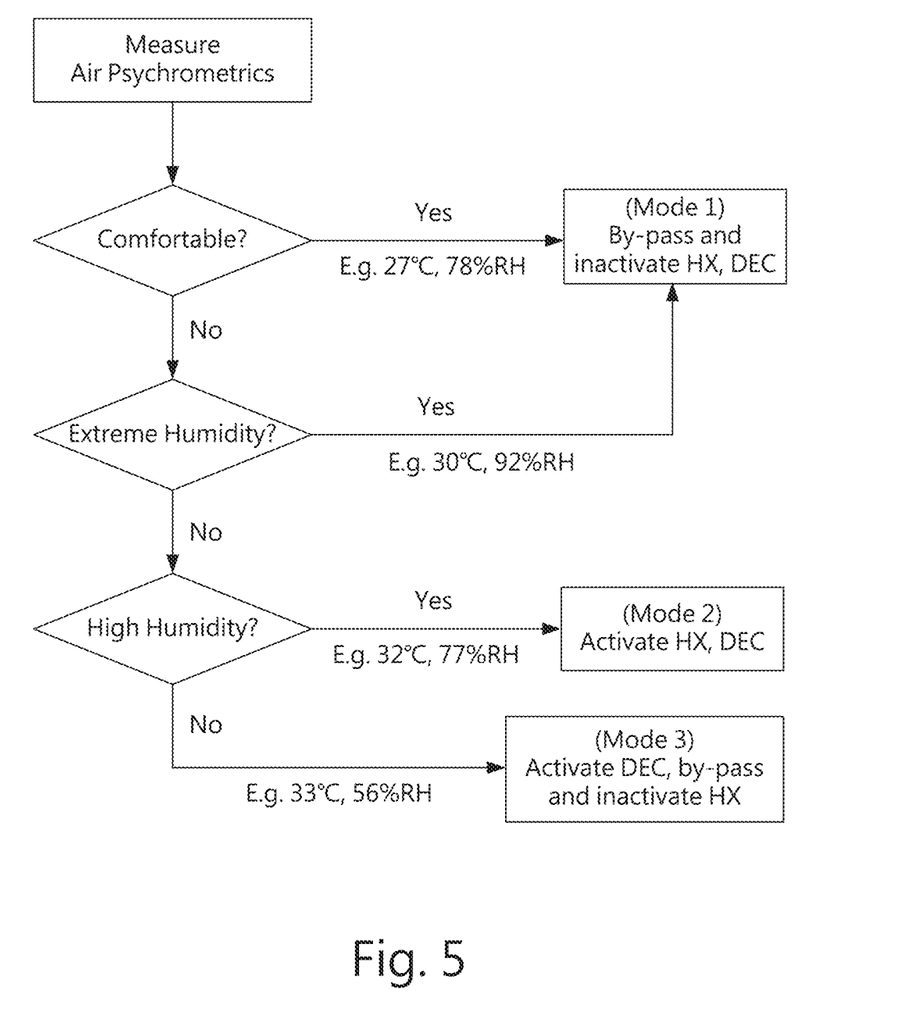
FIG. 5 shows a flowchart of the selection of operating method according to an embodiment of the present invention.

Illustrated in FIGS. 4A~4D and 5 is another embodiment of the present invention. The cooling components are composed of a heat exchanger (HX) 23 and a direct evaporative cooling unit (DEC) 21 which connected by channels for water flows. Additionally, the water flow 50 for both the direct evaporative cooling unit 21 and the heat exchanger 23 is illustrated in FIG. 4B. This structure is similar to that described earlier in FIG. 2. The controlling chip selects the appropriate operating mode based on the following psychrometric conditions:

[Mode 1]: For ambient psychrometric conditions that is at a comfortable level or extremely high humidity level. That is, Mode 1 is selected when ambient intake temperature is at a comfortable level so that no conditioning is required; or the humidity is at an extremely high level (e.g. over 90%) so that conditioning is limited. This operating mode will inactivate and by-pass both the direct evaporative cooling unit 21 and the heat exchanger 23 so that this operating mode has the lowest energy cost.

[Mode 2]: For ambient psychrometric conditions that is at a high humidity level. That is, when ambient intake humidity is at a high level (e.g. more than 60%). Both the direct evaporative cooling unit 21 and the heat exchanger 23 are activated to maximize cooling potential. The heat exchanger 23 provides an initial pre-cooling while the direct evaporative cooling unit 21 provides adiabatic cooling. In detail, refer to FIG. 4C, water is re-circulated through the direct evaporative cooling unit 21 and the heat exchanger 23; where post the direct evaporative cooling unit 21, water is expected to be approximately at the wet bulb temperature of the air stream through the direct evaporative cooling unit 21. As such, this cool water is then channeled through the heat exchanger 23 to provide a sensible pre-cooling to the air stream. Following this, the direct evaporative cooling unit 21 would exhibit a temperature gradient such that the top section is warmer than the lower end. Consequently, this top output portion of the direct evaporative cooling unit 21 is exhausted in order to ensure supply is of a sufficiently cool temperature. This operating mode will have the highest energy cost.

Figure 4D:
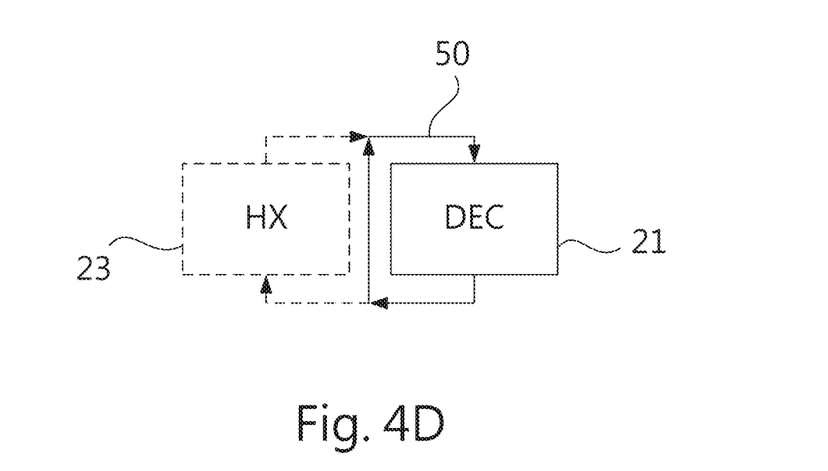

[Mode 3]: For ambient psychrometric conditions that is at a moderate to low humidity level. That is, when ambient intake humidity is at a moderate to low level (e.g. less than 60%). The device of the present invention will by-pass the inactivated heat exchanger 23 and ambient air is conditioned via the activated direct evaporative cooling unit 21. This operating mode will have a moderate energy cost, between Mode 1 and Mode 2. Refer to FIG. 4D, the energy can be saved because the heat exchanger 23 is not in operation.

Figure 6A:
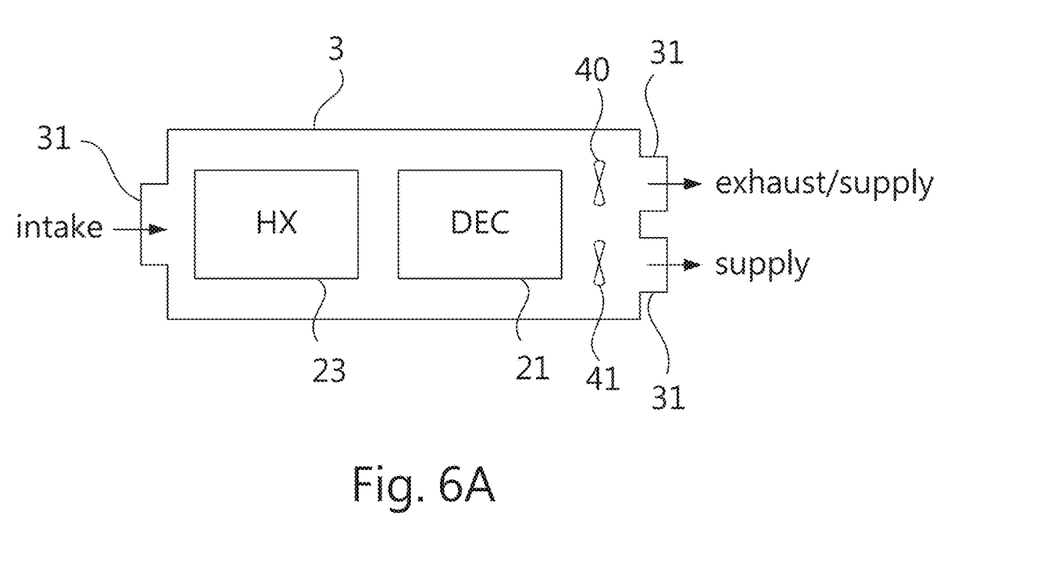
FIG. 6A shows a schematic diagram of the structure of coordinated cooling components according to another embodiment of the present invention.
Figure 6B:
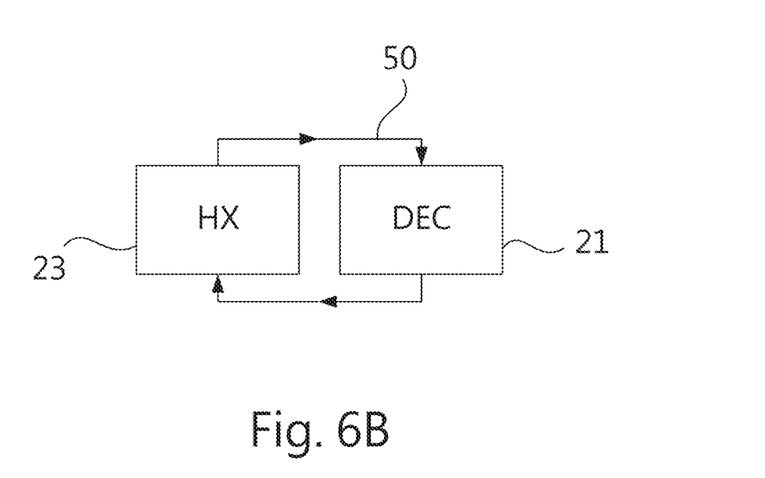
FIG. 6B shows a schematic diagram of the water flow according to another embodiment of the present invention.
Figure 7:
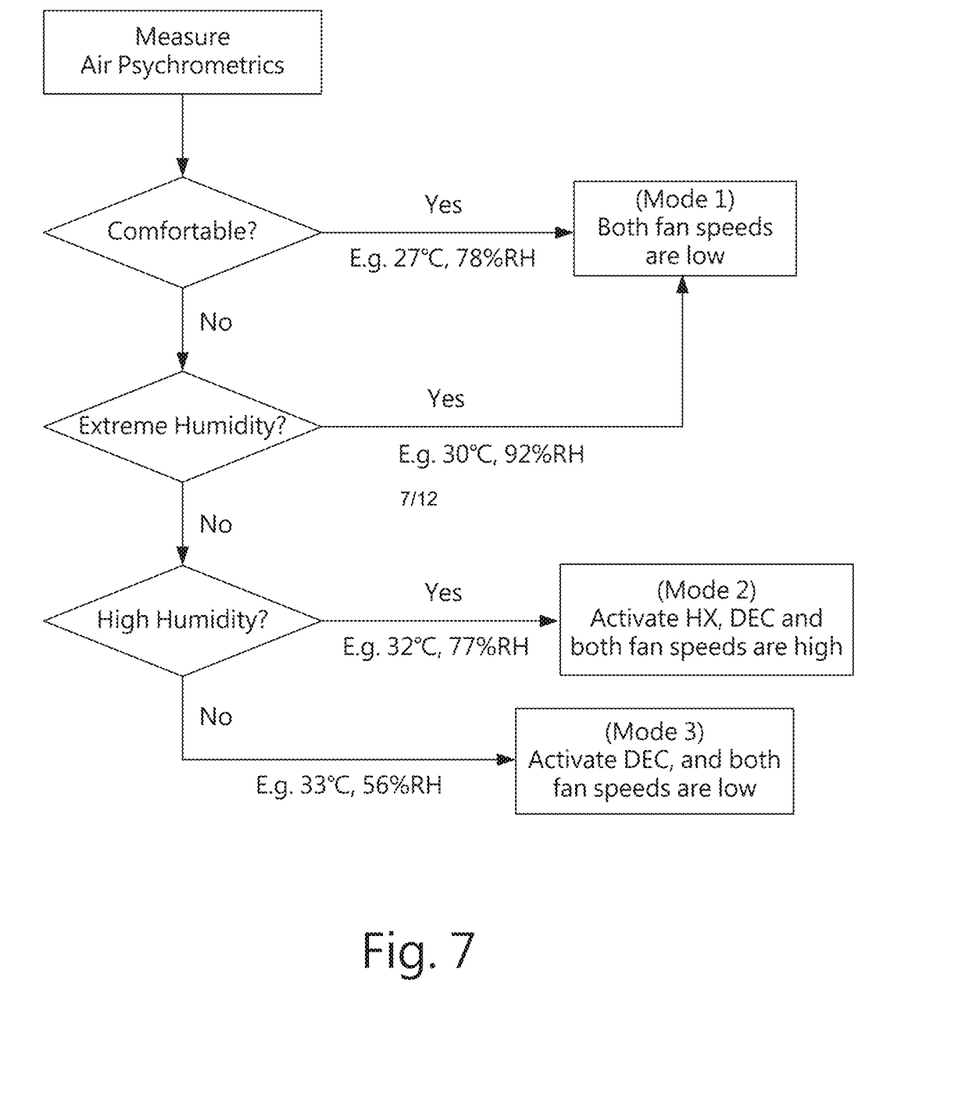
FIG. 7 shows a flowchart of the selection of operating method according to an embodiment of the present invention.

Please refer to FIGS. 6A~6B and 7, which shows another embodiment of the present invention that also uses a heat exchanger as one of the cooling components. Compared to the previous embodiment, this embodiment employs similar elements but differs in air flow and water flow channeling (as shown in FIG. 6B). In more detail, the air flow will not by-pass any inactive components and the control of air flow is achieved through the variation of the respective fans speeds as shown in FIG. 6A. The controlling chip, similarly, categorizes the ambient intake psychrometrics based on that described for the system in FIG. 4A. The operating modes are similar as well and the differences are described below:

[Mode 1]: The exhaust fan 40 and supply fan 41 are operating at low air speeds and both output psychrometrics are similar and are therefore both directed to supply. The low air speed operation also minimizes the energy cost associated with driving air through the direct evaporative cooling unit 21 and the heat exchanger 23, which are both inactive. This operating mode is selected when ambient intake temperature is at a comfortable level (e.g. the temperature is under 28° C. and the humidity is under 80%) or the humidity is at an extremely high level (e.g. over 90%).

[Mode 2]: The exhaust fan 40 and supply fan 41 are operating at high air speeds where the exhaust stream has a higher temperature than the supply stream. Therefore, both exhaust and supply streams are not combined as in Mode 1. The increase in air speed is meant to compensate for a reduced air flow as a result of the exhausting operation. This operating mode will have the highest energy cost as both the direct evaporative cooling unit 21 and the heat exchanger 23 are active.

[Mode 3]: The exhaust fan 40 and supply fan 41 are operating at low air speeds and both output psychrometrics are similar and are therefore both directed to supply. This operating mode will have a little more energy cost than in Mode 1. Only the direct evaporative cooling unit 21 is activated.

Figure 8:
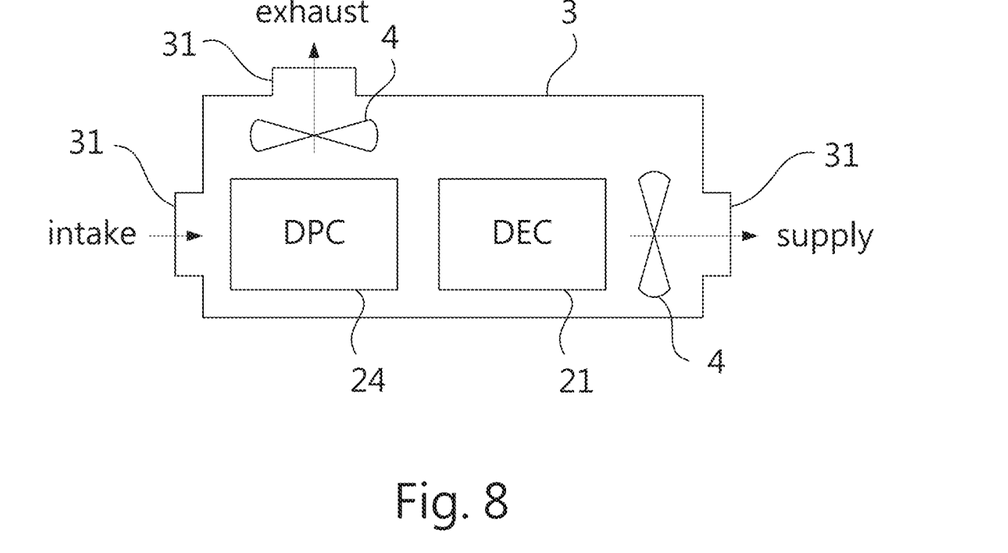
FIG. 8 shows a schematic diagram of the structure of coordinated cooling components according to another embodiment of the present invention.
Figure 9:
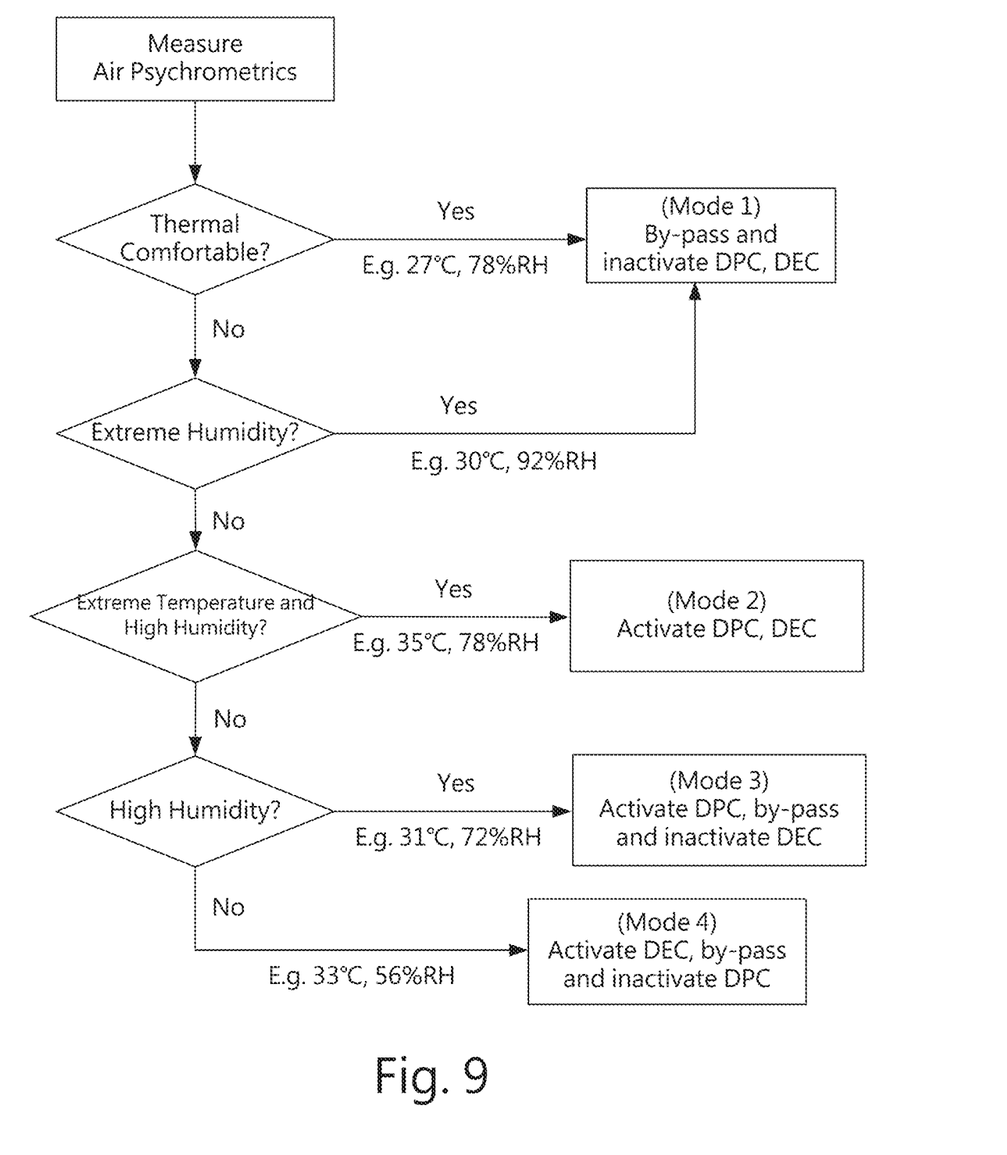
FIG. 9 shows a flowchart of the selection of operating method according to an embodiment of the present invention.

Please refer to FIGS. 8 and 9, which show another embodiment of the present invention. The cooling components are composed of a dew point cooling unit (DPC) 24 and a direct evaporative cooling unit 21. The dew point cooling unit 24 requires a re-circulation of air back into itself, acting as a secondary working stream that cools the supply stream sensibly and is then exhausted. Based on different psychrometric conditions, the following operation modes are carried out:

[Mode 1]: For ambient psychrometric conditions that is at a comfortable level or extremely high humidity level. That is, Mode 1 is selected when ambient intake temperature is at a comfortable level (e.g. the temperature is under 28° C. and the humidity is under 80%) so that no conditioning is required; or the humidity is at an extremely high level (e.g. over 90%) so that conditioning is limited. This operating mode will inactivate and by-pass the direct evaporative cooling unit 21 and the dew point cooling unit 24 so that it has the lowest energy cost.

[Mode 2]: For ambient psychrometric conditions that is at a high humidity level (e.g. more than 60%) and an extremely temperature level (e.g. over 32° C.). The combination of the direct evaporative cooling unit 21 and the dew point cooling unit 24 enables the conditioning of air that has a high temperature and humidity. In this configuration, the dew point cooling unit 24 provides a sensible pre-cooling that does not add moisture to the air stream. Following this, the air stream is then adiabatically cooled via the direct evaporative cooling unit 21. This operating mode would have the highest cost.

[Mode 3]: For ambient psychrometric conditions that is only at a high humidity level (e.g. more than 60%). The dew point cooling unit 24 is activated and the direct evaporative cooling unit 21 is inactivated and by-passed. The dew point cooling unit 24 is expected to be more effective at cooling the air stream sensibly than a conventional indirect evaporative cooling unit. This operating mode will have the second highest energy cost behind Mode 2 in this embodiment.

[Mode 4]: For ambient psychrometric conditions that is in moderate to low humidity level (e.g. less than 60%). The direct evaporative cooling unit 21 provides sufficient cooling and is activated while the dew point cooling unit 24 is by-passed and inactive. This operating mode would have the second lowest energy cost behind Mode 1 in this embodiment.

Figure 10:
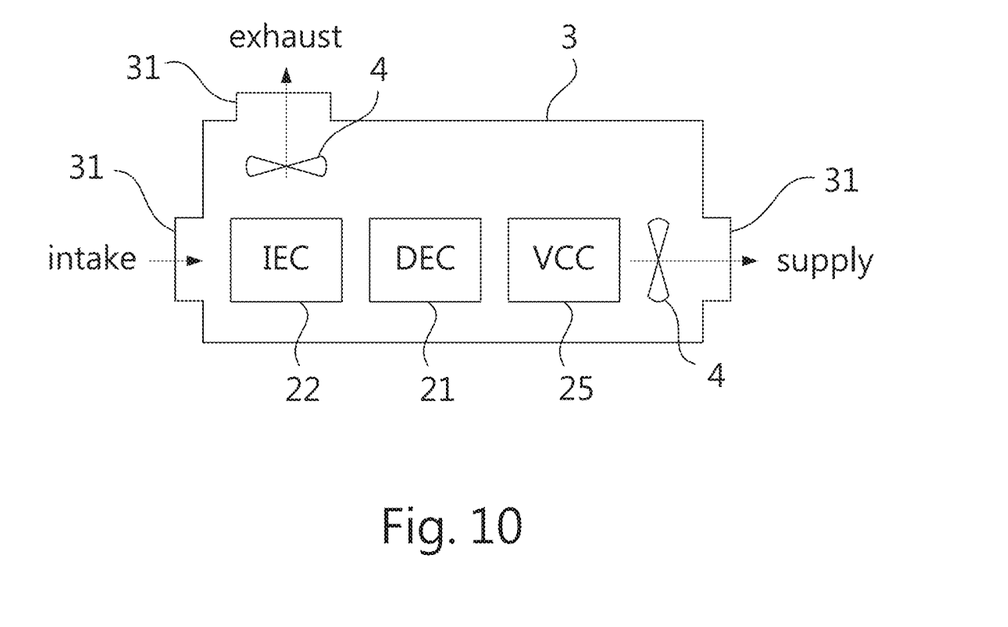
FIG. 10 shows a schematic diagram of the structure of coordinated cooling components according to another embodiment of the present invention.
Figure 11:
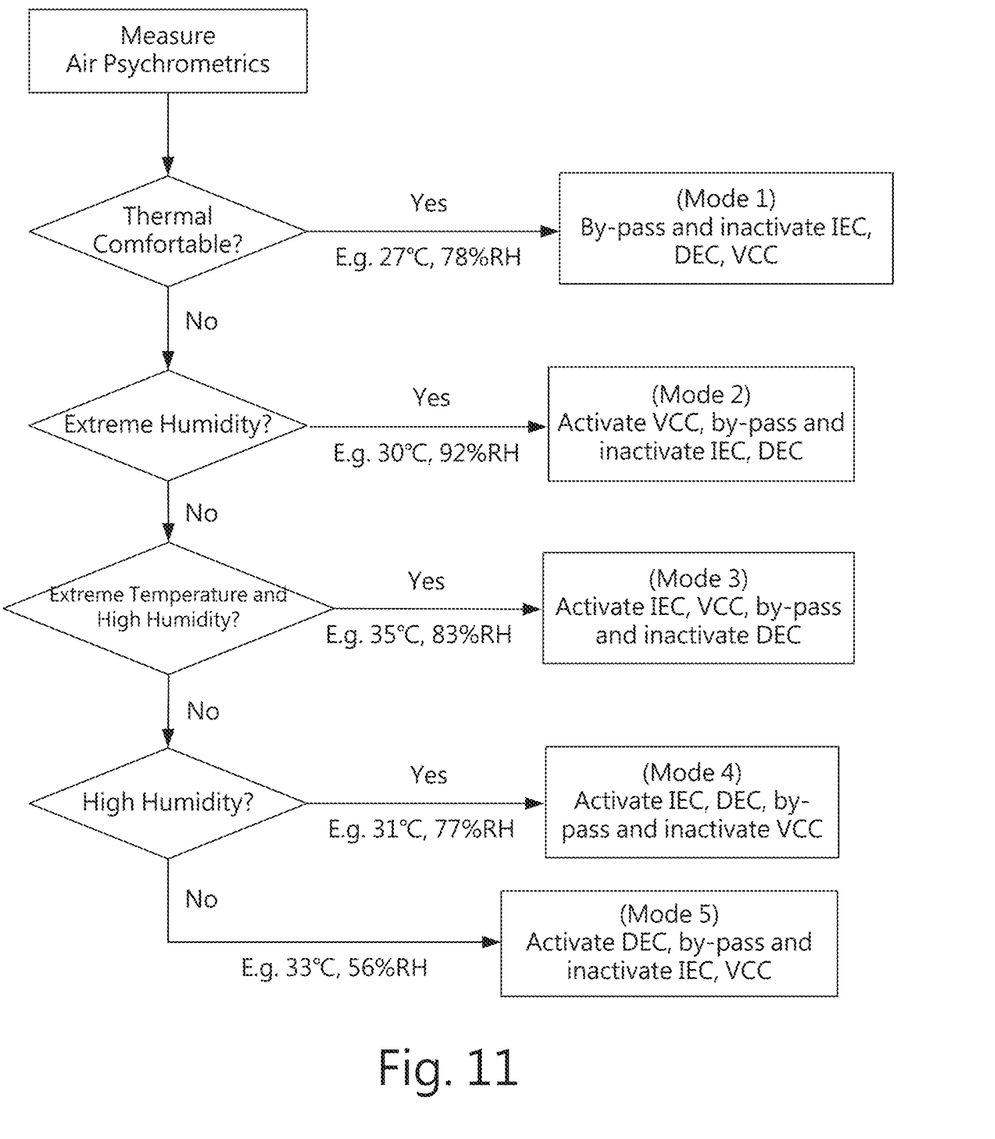
FIG. 11 shows a flowchart of the selection of operating method according to an embodiment of the present invention.

According to another embodiment of the present invention, refer to FIGS. 10 and 11, the cooling components are composed of a direct evaporative cooling unit 21, an indirect evaporative cooling unit 22, and a vapor compression cycle unit (VCC) 25, which is a 3-stage system. The addition of the vapor compression cycle unit 25 allows for air conditioning across a broader array of ambient air psychrometric conditions. The controlling chip identifies the operating modes as:

[Mode 1]: For ambient psychrometric condition that is at a comfortable level (e.g. the temperature is under 28° C. and the humidity is under 80%) and no conditioning is required. All cooling components are inactive and by-passed. This operating mode will have the lowest energy cost.

[Mode 2]: For ambient psychrometric condition that the humidity levels are extremely high (e.g. over 90%) where conditioning will involve both a sensible and latent heat removal. Therefore, only the vapor compression cycle unit 25 is in operation while the direct evaporative cooling unit 21 and the indirect evaporative cooling unit 22 are both inactivated and by-passed. This operating mode will have the highest energy cost.

[Mode 3]: For ambient psychrometric condition that is at a high humidity level (e.g. 90-80%) and an extremely temperature level (e.g. over 32° C.). The combination of the indirect evaporative cooling unit 22 and the vapor compression cycle unit 25 will adequately condition air to a comfortable level, whereas the direct evaporative cooling unit 21 is inactive and by-passed. In more detail, the indirect evaporative cooling unit 22 provides an initial sensible cooling that is of lower energy intensity than the vapor compression cycle unit 25, thus maximizing cooling efficiency. After which, the vapor compression cycle unit 25 provides both a sensible and latent heat removal. This operating mode will have the second highest energy cost in this embodiment.

[Mode 4]: For ambient psychrometric condition that the humidity is at a high level (e.g. more than 60%) and temperature is not at an extremely temperature level (e.g. under over 32° C.); both the direct evaporative cooling unit 21 and the indirect evaporative cooling unit 22 are activated. The vapor compression cycle unit 25 is inactive and by-passed as the ambient intake temperature is not high such that it is also a limiting factor for this operating mode. This operating mode will have the third highest energy cost, behind Mode 3 in this embodiment.

[Mode 5]: For ambient psychrometric condition that the humidity is at a moderate to low level (e.g. less than 60%); therefore, only the direct evaporative cooling unit 21 is activated, and by-passing the indirect evaporative cooling unit 22 and the vapor compression cycle unit 25. This operating mode will have the second lowest energy cost, behind Mode 1 in this embodiment.

Figure 12:
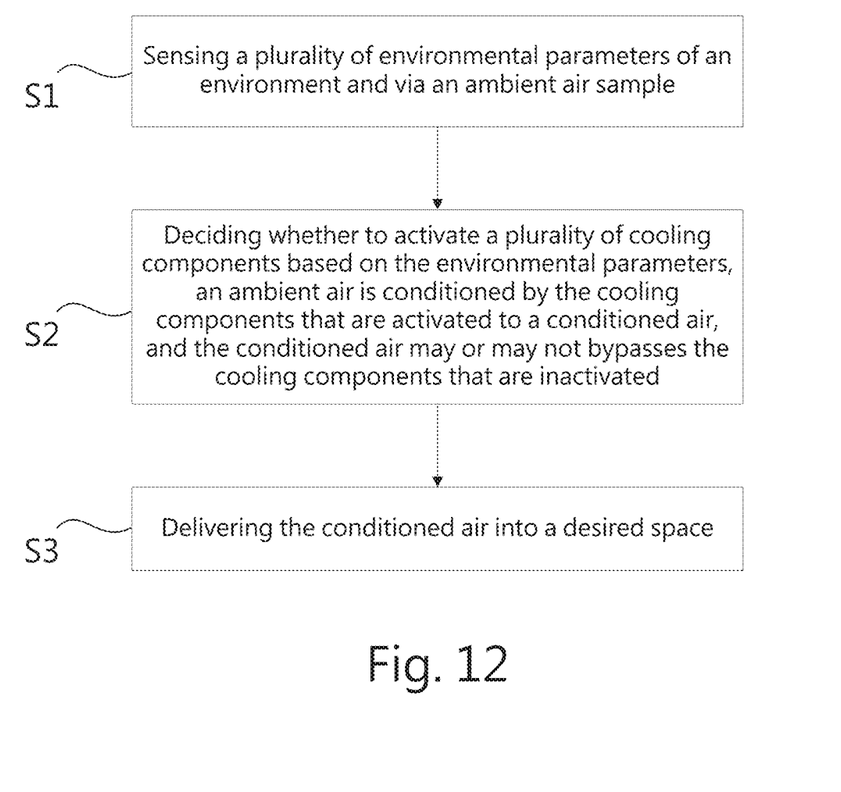
FIG. 12 shows a flowchart of the method according to an embodiment of the present invention.

Based on the above description, please refer to FIG. 12, the operating method for hybrid air-conditioner device according to the present invention can be organized as the following steps:

Step S1: Sensing a plurality of environmental parameters of an environment and via an ambient air sample;

Step S2: Deciding whether to activate a plurality of cooling components based on the environmental parameters, ambient air is conditioned by the cooling components that are activated, and the unconditioned or conditioned air may or may not bypass the cooling components that are inactivated; and Step S3: Delivering the conditioned air into a desired space.

To sum up, the present invention discloses in detail a hybrid air-conditioner device and operating method thereof. By sensing the psychrometric conditions of ambient air such as environmental parameters, which include humidity and temperature, it can evaluate whether the ambient air is comfortable relative to a human being. If the ambient air is not at a comfort level, the controller unit will determine the most efficient operating mode available to condition ambient air to a comfortable level. Under the circumstances that cooling components have its unique cooling methods respectively, the present invention integrates the cooling components perfectly and fully considers efficacy and energy cost. Hence, the present invention is endowed with the advantages of energy saving, high cooling efficiency, and providing fresh conditioned air.

Accordingly, the present invention conforms to the legal requirements owing to its novelty, non-obviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A hybrid air-conditioner device comprising:
    an environmental sensor configured to sense a plurality of environmental parameters;
    a controlling chip electrically connected to the environmental sensor; and
    a plurality of cooling components electrically connected to the controlling chip, the cooling components differing from each other;
    wherein each of the cooling components is activated or inactivated depending on the plurality of environmental parameters sensed by the environmental sensor in order to adjust the plurality of environmental parameters,
    wherein the plurality of cooling components is in a container,
    wherein the plurality of cooling components consists of a direct evaporative cooling unit (DEC) and a heat exchanger (HX); and
    a water channel connected to the direct evaporative cooling unit and the heat exchanger so that water can circulate through the direct evaporative cooling unit and the heat exchanger,
        wherein the hybrid air-conditioner device is configured to operate in one of three modes selected by the controlling chip,
        wherein mode 1 configures the device to inactivate the direct evaporative cooling unit and the heat exchanger;
        wherein mode 2 configures the device to activate the direct evaporative cooling unit and the heat exchanger such that the heat exchanger providing initial pre-cooling with the direct evaporative cooling unit providing adiabatic cooling, wherein the device is configured to re-circulate water through both the direct evaporative cooling unit and the heat exchanger, wherein the direct evaporative cooling unit is configured to exhibit a temperature gradient with the top section being warmer that the lower section; and
        wherein mode 3 configures the device to inactivate the heat exchanger and activate the direct evaporative cooling unit.

2. The hybrid air-conditioner device of claim 1, wherein the plurality of environmental parameters includes temperature and humidity.

3. The hybrid air-conditioner device of claim 1, further comprising a plurality of fans configured to take in air from an environment or to exhaust or supply the air to a desired space, wherein the plurality of fans is within the container.

4. A method for cooling ambient air by a hybrid air-conditioner device, the method comprising:
    sensing a plurality of environmental parameters of an environment by an environmental sensor via an ambient air sample;
    deciding whether to activate a plurality of cooling components of the hybrid air-conditioner device based on the environmental parameters sensed by the environmental sensor, and selecting one of three modes, whereby an ambient air is conditioned to a conditioned air by the cooling component that is activated, and the conditioned air may or may not by-pass the cooling component that is inactivated, wherein the cooling components comprise a direct evaporative cooling unit and a heat exchanger, the direct evaporative cooling unit and the heat exchanger are connected by a water channel so that water can circulate through the direct evaporative cooling unit and the heat exchanger;
    wherein mode 1 inactivates the direct evaporative cooling unit and the heat exchanger;
    wherein mode 2 activates the direct evaporative cooling unit and the heat exchanger, wherein the heat exchanger provides initial pre-cooling and the direct evaporative cooling unit provides adiabatic cooling, wherein water is re-circulated through both the direct evaporative cooling unit and the heat exchanger, wherein the direct evaporative cooling unit exhibits a temperature gradient with the top section being warmer that the lower section;
    wherein mode 3 inactivates the heat exchanger and activates the direct evaporative cooling unit and delivering the conditioned air to a desired space,
wherein the plurality of cooling components is in a container.

5. The method of claim 4, wherein the mode 1 is selected if a humidity of the environment is over 90%; the mode 2 is selected if humidity of the environment is over 60% and less than 90%; the mode 3 is selected and the heat exchanger is inactivated if the humidity of the environment is less than 60%.

6. The method of claim 4, further comprising: providing a plurality of fans with varied fan speed to draw in air from the environment, to exhaust warm air from the hybrid air-conditioner device, and/or to supply the conditioned air to the desired space, wherein the plurality of fans is within the container.

* * * * *